US007676359B2

(12) United States Patent
Martin, Jr. et al.

(10) Patent No.: US 7,676,359 B2
(45) Date of Patent: Mar. 9, 2010

(54) SYSTEM AND METHOD FOR SYNCHRONIZING LANGUAGES AND DATA ELEMENTS

(75) Inventors: James A. Martin, Jr., Endicott, NY (US); Douglas G. Murray, Johnson City, NY (US)

(73) Assignee: International Business Machines Corporation, Armonk, NY (US)

(*) Notice: Subject to any disclaimer, the term of this patent is extended or adjusted under 35 U.S.C. 154(b) by 631 days.

(21) Appl. No.: 11/244,921

(22) Filed: Oct. 6, 2005

(65) Prior Publication Data

US 2007/0083358 A1    Apr. 12, 2007

(51) Int. Cl.
    G06F 17/20    (2006.01)
(52) U.S. Cl. .............. 704/8; 704/4; 704/5; 704/9; 707/101; 714/38; 715/866; 715/236
(58) Field of Classification Search ........ 704/4, 704/8, 9, 5; 715/866, 236; 707/101; 714/38
    See application file for complete search history.

(56) References Cited

U.S. PATENT DOCUMENTS

| 5,416,903 | A  | * | 5/1995  | Malcolm ............... 715/703 |
| 6,507,813 | B2 | * | 1/2003  | Veditz et al. ............ 704/8 |
| 6,530,039 | B1 | * | 3/2003  | Yang .................... 714/38 |
| 6,704,737 | B1 | * | 3/2004  | Nixon et al. ........... 707/101 |
| 7,240,066 | B2 | * | 7/2007  | Burchall et al. ........ 707/101 |
| 7,380,206 | B1 | * | 5/2008  | Usuda .................. 715/236 |
| 7,509,325 | B2 | * | 3/2009  | Martin et al. ........... 707/10 |
| 2003/0126559 | A1 | * | 7/2003  | Fuhrmann ............. 715/513 |
| 2003/0177441 | A1 | * | 9/2003  | Clarke et al. .......... 715/513 |
| 2004/0230416 | A1 | * | 11/2004 | Ye et al. ................ 704/5 |
| 2004/0268306 | A1 | * | 12/2004 | Cheng et al. ........... 717/114 |
| 2005/0177358 | A1 | * | 8/2005  | Melomed et al. ........ 704/2 |
| 2005/0204332 | A1 | * | 9/2005  | Krishnan et al. ....... 717/102 |
| 2006/0210026 | A1 | * | 9/2006  | Duplessis et al. ..... 379/88.05 |
| 2006/0271352 | A1 | * | 11/2006 | Nikitin et al. ........... 704/9 |
| 2007/0027670 | A1 | * | 2/2007  | Verhey-Henke et al. ... 704/2 |

OTHER PUBLICATIONS

EIC_Search_Report.*

* cited by examiner

*Primary Examiner*—David R Hudspeth
*Assistant Examiner*—Edgar Guerra-Erazo
(74) *Attorney, Agent, or Firm*—John R. Pivnichny; Law Office of Jim Boice

(57) ABSTRACT

Data languages, executable programs, and user interfaces are synchronized by a database for storing data enumerations in a first language, a configuration file for mapping language neutral tags to the data enumerations, a user interface operable responsive to the language neutral tags for presenting to a user interface view selected data enumerations in the second language; the user interface responsive to user selection at the user interface view of a data enumeration in the second language corresponding to a selected language neutral tag for accessing the configuration file to retrieve a corresponding data enumeration in the first language, and for returning the corresponding data enumeration to the database.

12 Claims, 6 Drawing Sheets

EMMIT Machine Data (V2,3,3)

Owner/User
- ***Serial: 051294  [Unknown]  [Look Up]
- Last Name: Murray    Tie: 620-3828

Location Information
- *Site: Endicott ▽    *Movers Required ○ Yes ⦿ No
- *Building: 25    *Floor: 4    *Office: D011

Machine Information
- *Mfg: IBM ▽    *Serial: [   ]  [Unknown]
- *Type: [   ]
- *Model: [   ]
- * OS: Windows 2000 ▽
  - Windows 95
  - Windows 98
  - Windows NT
  - Windows 2000
  - Windows xp
  - OS/2
  - Linux
- * Version
- [Type N/A] [Model N/A]

Network Cards or Drivers Found

| Vfy | Sup | Port ID | Card Name |
|---|---|---|---|
| | Yes | | <26P8069>Intel[R |
| | No | | IBM Turbo 16/4 |

[Add] [Edit] [Remove] [Recommended Adapter]

[<Previous] [Next>] [Help] [Prefill] [Cancel]

FIG. 4

SYSTEM AND METHOD FOR SYNCHRONIZING LANGUAGES AND DATA ELEMENTS

BACKGROUND OF THE INVENTION

1. Technical Field of the Invention

This invention relates to data storage and display, and more particularly to synchronizing data representation and data processing and display in a plurality of languages.

2. Background Art

During a large migration project there is a need to collect data from the users being migrated and place that collected data in a centralized database. When the sites being migrated are world wide, there is also a need to support many languages. Not only the dialogs have to be converted to each language in the normal way, but the results returned by the tool and placed as data elements in the database need to be in synchronization with the language and enumerations that the database expects.

National Language Support (NLS) has been used to convert a program to a correct language, and to translate dialogs. However, there is needed the facility for on-the-fly conversion, and for such facility to enable communication between two programs working in different languages.

Many times when database systems, such as the IBM DB2 or Lotus Notes database systems, are being used to store data collected by a user there is a need to provide a tool that is used by the user to enter the data collected without having to have the database application software installed on the user's computer. Further, if the user speaks a different language than the database is using, for example the user is in France but the database is being administered in Spain, then there is a need to provide a means for having the user interface presentation in one language and the results conveyed from the interface to the database in a different language.

IBM, DB/2, Lotus, Notes, and Lotus Notes are trademarks of International Business Machines Corporation in the United States, other countries, or both.

SUMMARY OF THE INVENTION

A system, method, and computer program product for synchronizing data languages, executable programs, and user interfaces by storing data enumerations in a database in a first language; mapping in a configuration file language neutral tags to the data enumerations; operating a user interface responsive to the language neutral tags to present to a user interface view selected data enumerations in the second language; responsive to user selection at the user interface view of a data enumeration in the second language corresponding to a selected language neutral tag, accessing the configuration file to retrieve a corresponding data enumeration in the first language; and returning the corresponding data enumeration to the database.

Other features and advantages of this invention will become apparent from the following detailed description of the presently preferred embodiment of the invention, taken in conjunction with the accompanying drawings.

BRIEF DESCRIPTION OF THE DRAWINGS

FIG. 4 illustrates a user interface showing data display and input fields.

DETAILED DESCRIPTION OF THE BEST MODE

The preferred embodiments of the system and method of the invention synchronize data languages, executable programs, and user interfaces by placing enumerations that a database expects in a configuration, or control, file. A tool reads the configuration file and allows the user to select the appropriate choice from, for example, a drop down list presented at a user interface. The database provides the possible responses to the tool and the tool returns the one that is selected.

The control, or configuration, file contains language neutral tags that map to the desired result in the database language, L1. The user interface presents or lists the choices in language L2 and uses the language neutral tags to determine what to return to the database in language L1 when a choice is made by the user in the interface.

The control file may contain something like . . .
[Prompt P1]
LangNutralTagA=AnswerAinL1
LangNutralTabB=AnswerBinL1
. . .
(The last line of the above example reads "Language Neutral Tab B=Answer B in Language L1")
The user interface presents to the user a list of choices in the language L2 of the user, like . . .
Please Choose From the Following . . .
[ ]AnswerAinL2
[ ]AnswerBinL2
If answer B is chosen, then the returned information would be like . . .
PromptP1=AnswerBinL1

Figure 1:
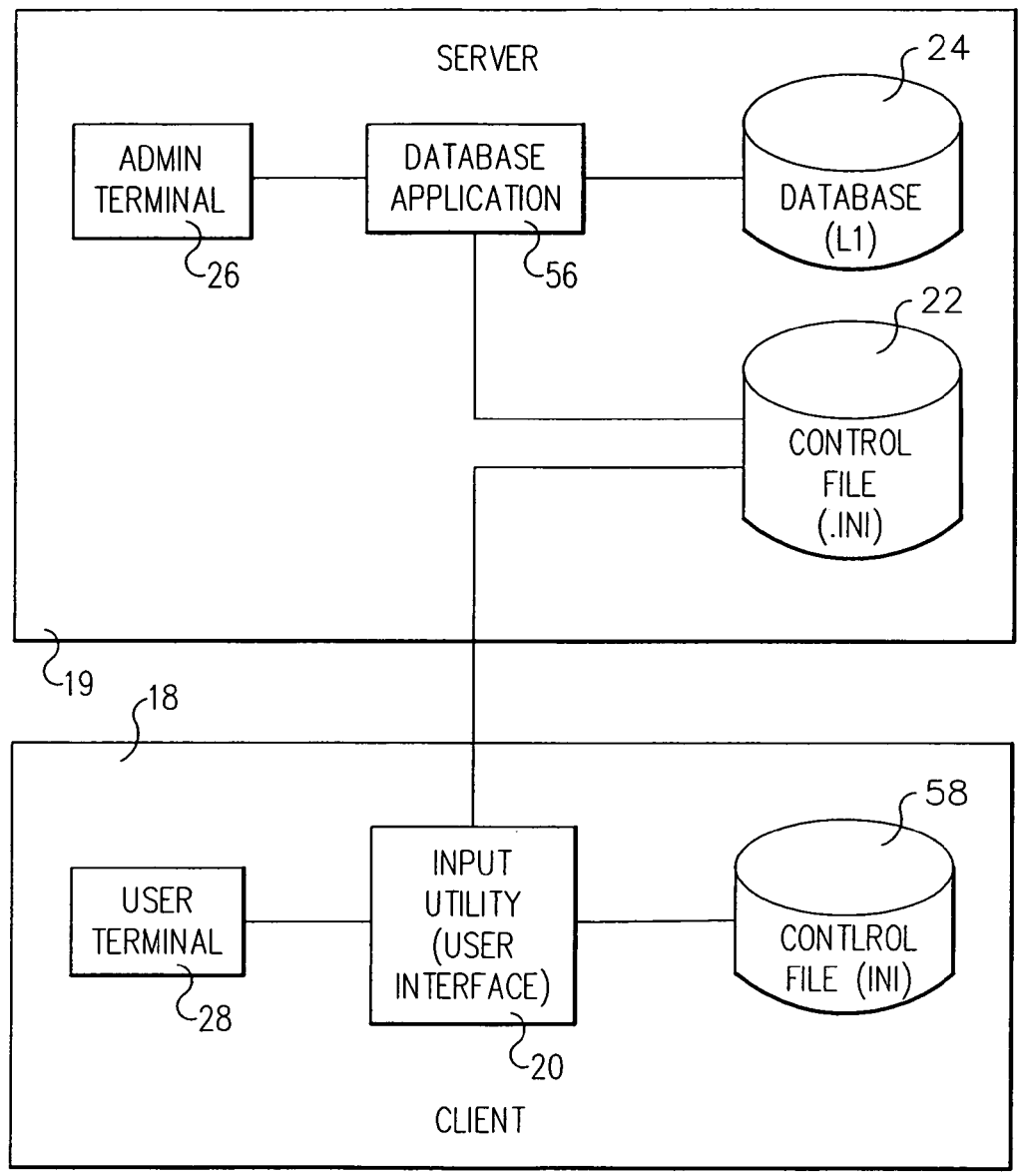
FIG. 1 is a high level diagram of selected components of an exemplary embodiment of the system of the invention.

Referring to FIG. 1, a preferred embodiment of the invention provides at a client machine 18 a user terminal 28, a data input utility 20, and a local copy 58 of control file 22; and at a server machine 19 an administration terminal 26, a database application 56, a database storage device 24, and a control file 22. In operation, control (.INI) file 22 resides on server 19 and a local copy 58 of the .INI file 22 is maintained on client 18 with input utility 20. With reference to database 24, database application 56 creates control file 22 with appropriate language neutral tags and answers in language L1. User interface application program 20 goes to server 19 and retrieves .INI file 22 each time it needs it, using the local copy 58 if it cannot get it, thus insuring that the latest version of the .INI file is in use.

Figure 2:
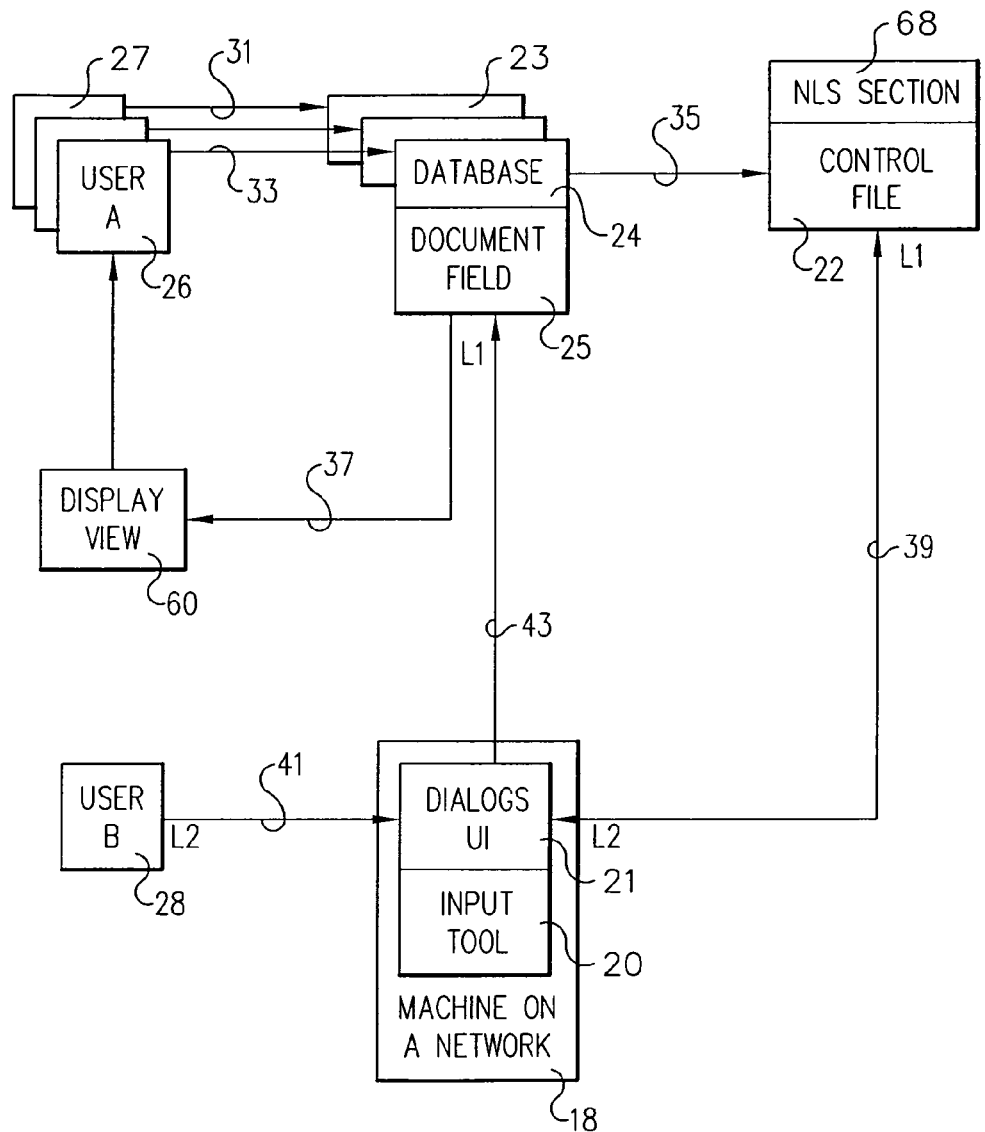
FIG. 2 is a more detailed diagram of further selected components of an exemplary embodiment of the system of the invention.

Referring to FIG. 2, a more detailed exemplary embodiment of the system of the invention includes a plurality of user A terminals 26, 27 with corresponding databases 23-24 at a plurality of sites or users. Database 24, for example, includes a document field 25 which, as is represented by line 37, may be rendered to user A 26 as display view 60. User A 26 may be an administrator terminal. Control file 22 at server site 19 is loaded with, for example, data from database 24 as is represented by line 35 to include data in language L1 together with language neutral tags, as will be explained hereafter. As is illustrated in FIG. 1, control file 22 may be replicated as file 58 at client machine 18. Input tool 20 on a client machine 18 on a network, for example, is provided with dialogs 21 which are rendered on terminal 28 for use by user B 28, as represented by line 41, to input data to database 24 via fields 25, as is represented by line 43. Input tool 20 accesses control file 22 (or local copy 58 of control file 22) to convert data between languages L1 and L2, as will be described more fully hereafter.

In an exemplary embodiment, the database 24 is implemented in an IBM Lotus Notes database associated with an .INI file 22 that is used to configure a data input tool 20.

A National Language Support (NLS) section 68 of the .INI file 22 is generated by the Notes database 24 and then used to place language dependent answers in a return file 24. The NLS section 68 of .INI file 22 is used to ensure that the collection tool 20 and the Notes database 24 are synchronized with respect to returned values for any value that might have language considerations. If this section does not exist, then English language defaults may be used. Normally, this section is not modified by an end user.

In accordance with a preferred embodiment the method of the invention, a process is provided for enabling communication between an executable program such as a data input utility 20 and a database 24, whereby the executable 20 handles whatever language the main database 24 requires and presents input to a user in the language L2 of the user. The required language needed in the database 24 is defined, which provides in control file 22 the return value for a specific query. This control file 22, or stream of information is, in a preferred embodiment, an .INI file. The database application 56 at server 19 initializes this .INI file 22, and a local copy 58 is maintained at client 18 so that responses from interface 20 will be returned in the language L1 of database 24.

An input tool 20 is provided as the interface to a user at terminal 28. This tool 20 goes to the server control file 22 to get the latest list of answers to return to the database 24. Control file 22 is loaded from database 24 when a user 28 tells the database the language in which it desires results.

In another exemplary embodiment of the invention, other than national language differences between executing programs is accommodated, such as changing the name of "status" from "complete" to "done" or "comp", and to make that change in the control file 22. For another example, a yes or no 64 response on an input tool 20 dialog 21 (or 60, see FIG. 4) may be converted to true or false on the input 43 to database 24.

Figure 3:
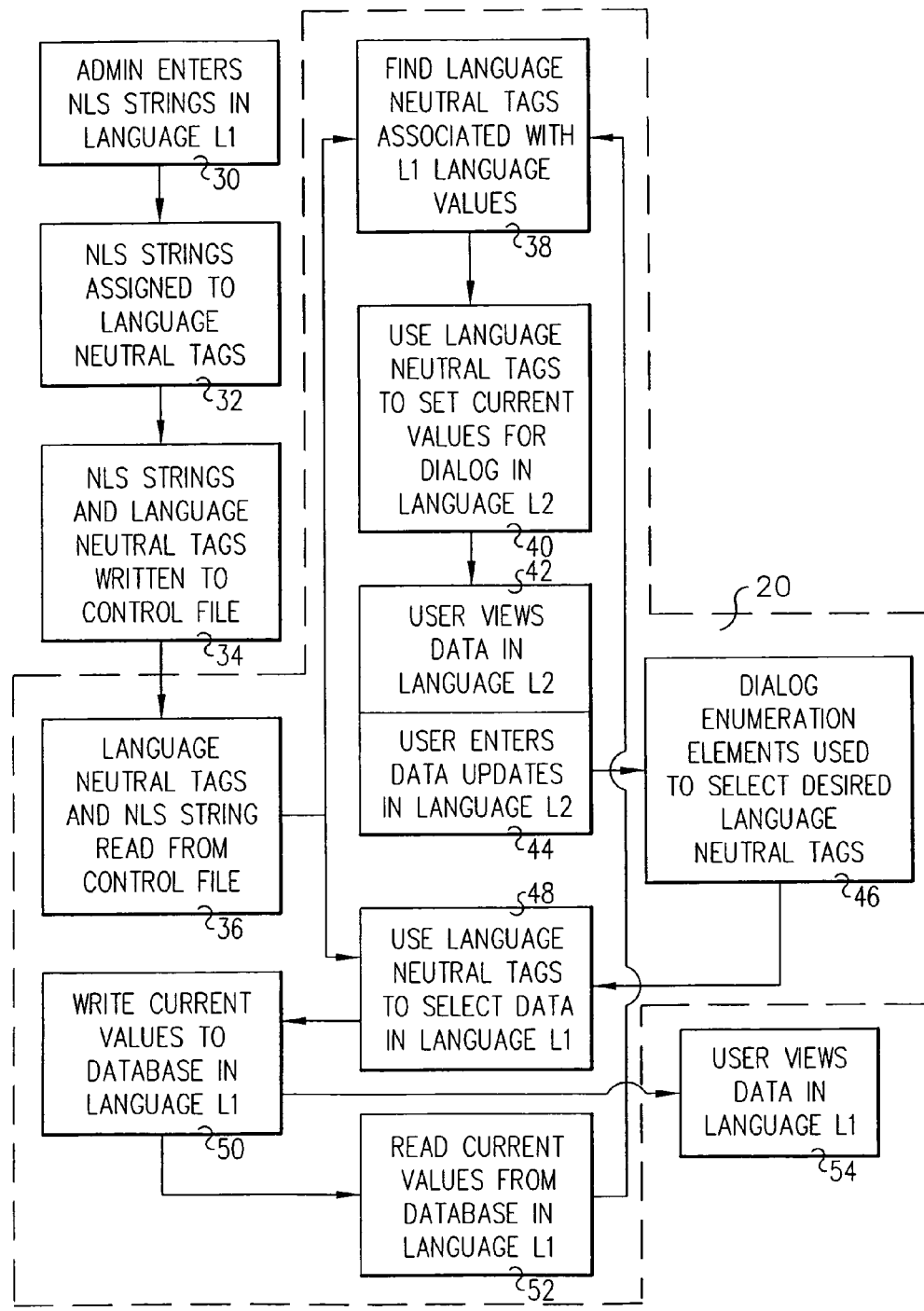
FIG. 3 is a flow chart of the process of the invention.

Referring to FIG. 3, a flow chart illustrates the steps of the method of the invention.

In step 30, a system administrator at terminal 26 enters NLS strings in language L1 to database application 56 and thence to database 24. In step 32, these NLS strings are assigned to language neutral tags (for subsequent entry to control file 22).

Table 1 presents the decoration of the variables that will hold the L1 values. Each variable name corresponds to a language neutral tag. For example, the variable NLSType.Yes holds the L1 value for 'yes' that will be returned to database 24 any time 'Yes' is selected by user 28 in response to a 'Yes/No' question in the interface presented to the user by input utility 20.

Table 2 lists the code that looks for the language neutral tags within the NLS 68 section of the .INI file 22. For example . . .

[NLS]
Yes=Ya
No=Na would cause the value 'Ya' to be returned to database 24 when user 28 chooses the 'Yes' option in user interface, or input tool 20.

Table 3 is an example of presenting a choice on the input tool 20 based on an existing value and the L1 value from .INI file 22 (or 58).

Table 4 is an example of how to return the value in L1 given the L1 values read in from the .INI file 22 (or 58) and the choice made by user 28 on input tool 20.

In step 34 these NLS strings and language neutral tags are written to control file 22.

In step 36, data input utility reads these NLS strings and language neutral tags from control file 22, first, for use in steps 38-42 for populating the user interface 21 in language L2 and, second, for converting in step 48 input from the user interface 21 to language L1 to return user selections to database 24.

In step 38, data input utility 20 finds in control file 22 language neutral tags associated with language L1 values, and uses these language neutral tags in step 40 for setting current values for dialog (UI 21 on user terminal 28) in language L2. In step 42 the user at terminal 28 views the data in view 21 in language L2 and in step 44 updates that data. In step 46 data input utility 20 uses dialog enumeration elements received via terminal 28 to select desired language neutral tags from control file 22 (or local control file 58), and in step 48 uses these selected language neutral tags to select data in language L1 which, in step 50, it writes to database 24 in language L1. In step 54, a user at, say, terminal 26 may view in view 60 updated data from database 24 in language L1.

Thus, language neutral tags and L1 values are used to set initial display selections on input tool 20 in language L2 as well as convert the selections made by user 28 at input tool 20 to the corresponding L1 values when those selections are complete. In step 50, values converted to L1 are sent back to database 24.

In accordance with the preferred embodiment of the invention, a database 24 sends the values of possible choices in language L1 to input tool 20 so that choices can be displayed in language L2 to a user 28, and the choices made by the user 28 are converted back to language L1 and sent back to database 24.

Referring to FIG. 4, display 60 illustrates in yes/no selections 64 aspects of a user interface of an exemplary embodiment of the invention. This figure presents one example of input utility user interface 20. The yes/no selection 64 is presented in language L2, English in this case. When next button 66 is selected, the language neutral tags in the .INI file 22 or 58, NLSYes and NLSNo are used to determine the language L1 equivalent to return to database 24.

By way of further example, an operating system selection drop down 62 could use a series of language neutral tags to map a selection in language L1 to a returned value in language L2.

Figure 5:
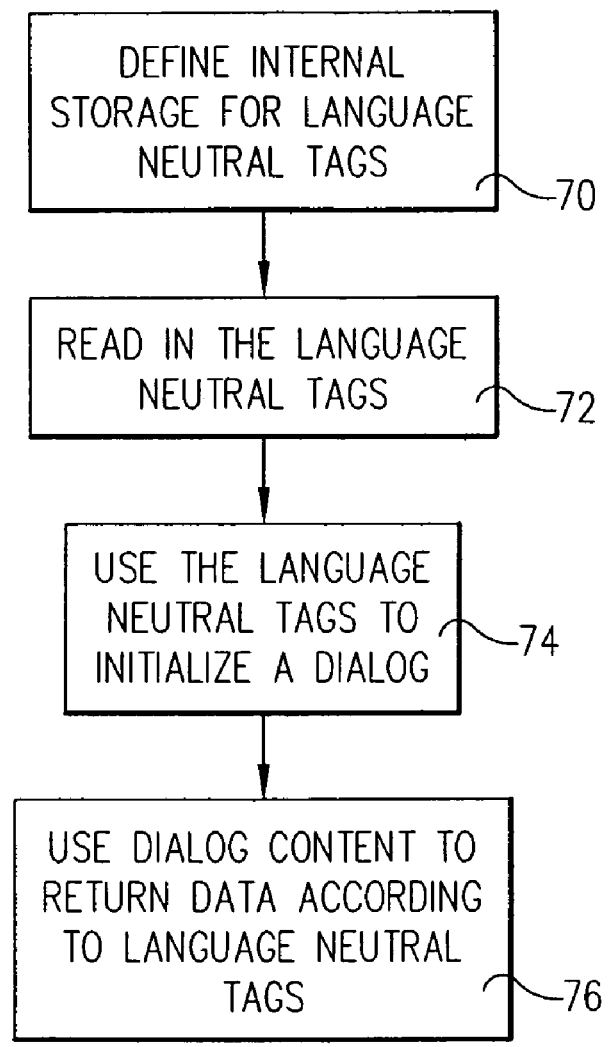
FIG. 5 is a flow chart illustrating selected steps in the execution of the process of the invention.

Referring to FIG. 5 in connection with Tables 1-4, an exemplary embodiment of the present invention includes in step 70 (Table 1) defining internal storage for language neutral tags, in step 72 (Table 2) reading language neutral tags into internal storage, in step 74 (Table 3) using language neutral tags to initialize and populate a user dialog, and in step 76 (Table 4) the user interacting with dialog content to return data according to language neutral tags.

TABLE 1

DEFINE STORAGE FOR LANGUAGE NEUTRAL TAGS

```
typedef struct
    {BOOL CCLeared;
     CString Yes;
     CString No;
     CString UnknownOwner;
     CString NoneNeededOwner;
     CString UnknownSerial;
     CString BlockedPort;
     CString StaticPrinterJust;
     CString NoType;
     CString NoModel;
     CString ArrayOwnerCC;
     CString AdapterDelivered;
     CString AdapterNotDelivered;
     CString AdapterNotRequired;
     CString IBM;
     CString StatusOpen;
     CString StatusPending;
     CString StatusNoMigration;
     CString StatusComplete;
     CString SerialNotInBluePages;
     CString MachineNotAvailable;
    }NLSType
```

TABLE 2

READ IN LANGUAGE NEUTRAL TAGS

```
//NLS values
    else if(!section.Compare("NLS")
        {if(!var.CompareNoCase("YES"))
            {NLS.Yes=value;
            }
         else if(!var.CompareNoCase("NO"))
            {NLS.No=value;
            }
         else if(!var.CompareNoCase("BLOCKEDPORT"))
            {NLS.BlockedPort=value;
            }
         else if(!var.CompareNoCase("UNKNOWNSERIAL"))
            {NLS.UnknownSerial=value;
            }
         else if(!var.CompareNoCase("UNKNOWNOWNER"))
            {NLS.UnknownOwner=value;
            }
         else
    if(!var.CompareNoCase("STATICPRINTERJUSTIFICATION"))
            {NLS.StaticPrinterJust=value;
            }
         else if(!var.CompareNoCase("NOTYPE"))
            {NLS.NoType=value;
            }
         else if(!var.CompareNoCase("NOMODEL"))
            {NLS.NoModel=value;
            }
         else if(!var.CompareNoCase("IBM"))
            {NLS.IBM=value;
            }
         else if(!var.CompareNoCase("CC"))
            {if(!NLS.CCCleared)
                {NLS.CCCleared=true;
                 NLS.OwnerCC.RemoveAll( );
                }
            NLS.OwnerCC.Add(value);
            }
         else if(!var.CompareNoCase("STATUSOPEN"))
            {NLS.StatusOpen=value;
            }
         else if(!var.CompareNoCase("STATUSPENDING"))
            {NLS.StatusPending=value;
            }
         else if(!var.CompareNoCase("STATUSNOMIGRATION"))
            {NLS.StatusNoMigration=value;
            }
```

TABLE 2-continued

READ IN LANGUAGE NEUTRAL TAGS

```
         else if(!var.CompareNoCase("STATUSCOMPLETE"))
            {NLS.StatusComplete=value;
            }
         else if(!var.CompareNoCase("SERIALNOTINBLUEPAGES"))
            {NLS.SerialNotInBluePages=value;
            }
         else if(!var.CompareNoCase("MACHINENOTAVAILABLE"))
            {NLS.MachineNotAvailable=value;
            }
        }
```

TABLE 3

INITIALIZE DIALOG USING LANGUAGE NEUTRAL TAGS

```
else
    {Os.EnableWindow(TRUE);
     OsVersion.EnableWindow(true);
     OS.ResetContent( );
         SelfInstall.RemoveAll( );
         for(coutn=0;count<class_data->OsList.GetSize( );count++)
            {del=(class_data->OsList) [count] [0];
             Parse_String((class_data->OsList) [count],del);
             Os.AddString(Parse_String(" ",del));
                self_install=Parse_String(" ",del);
    SelfInstall.Add(!self_install.CompareNoCase(NLS.Yes));
        }
     Select_CBItem(Os,MachineData.Os);
         OnSelchangeOS( );
    }
```

TABLE 4

USE DIALOG CONTENT TO RETURN DATA USING LANGUAGE NEUTRAL TAGS

```
////////
// save movers needed
////////
static void SaveMoversNeeded(FILE *file)
    {if(MachineData.MoversNeeded)
        {fprintf(file,"NeedMovers=%s/n",NLS.Yes);
        }
     else
        {fprintf(file,"NeedMovers=%s/n",NLS.No);
        }
    }
```

In the above described embodiment, the following values may be implemented for an exemplary inventory control process, such as the Ethernet Migration Manager (EMM), an example of database 24 used to plan and track the progress of migration of workstations from Token Ring to Ethernet.

| | |
|---|---|
| Yes | The value returned whenever a Yes response is needed. |
| No | The value returned whenever a No response is needed. |
| BlockedPort | The value returned as the port ID when it is blocked and the inventory personnel can not read it. |
| UnknownSerial | The value returned as the MachineSerial if it is not known at the time the inventory was taken. |
| UnknownOwner | The value returned in the OwnerSerial if the owner is not known at the time the inventory was taken. |

-continued

| | |
|---|---|
| StaticPrinterJustification | The justification that will be given to all network printers. |
| IBM | The name of IBM to be used to check for an IBM manufacturer. |
| CC | The country code, used for blue pages look up. |
| AdapterDelivered | The text string that is used to indicate that a card was delivered for self install. |
| AdapterNotDelivered | The text string that is used to indicate that a card is not required for self install. |
| StatusOpen | The status to pass back when the new document is to be in the open status in EMM. |
| StatusPending | The status to pass back when the new document is to be in the pending status in EMM. |
| StatusNoMigration | The status to pass back when the new document is to be in the NoMigration Status in EMM. |
| StatusComplete | The status to pass back when the new document is to be in the Complete status in EMM. |
| SerialNotInBluePages | The incomplete reason that is automatically chosen if the user's serial number is not found in Blue Pages. |
| MachineNotAvailable | The incomplete reason that is passed back when the employee/machine is not available. |

As an example, the tool 20 needs to ask in language L2 if the user 28 has a fixed address associated with a machine. The values associated with Yes and No are then returned in language L1 as the answer according to how the user answers in language L2. The language L2, used to respond, is then the language that the database 24 placed in the configuration file (.INI) 22. Thus the (languages L1 and L2) are synchronized. That is, the language of the responses chosen in input tool 20 are synchronized with the database 24 language L1, even though the user 28 of input tool 20 sees the question in language L2.

Advantages over the Prior Art

There is provided a system, method, and computer program product for improved synchronization of data languages, executable programs, and user interfaces.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 6:
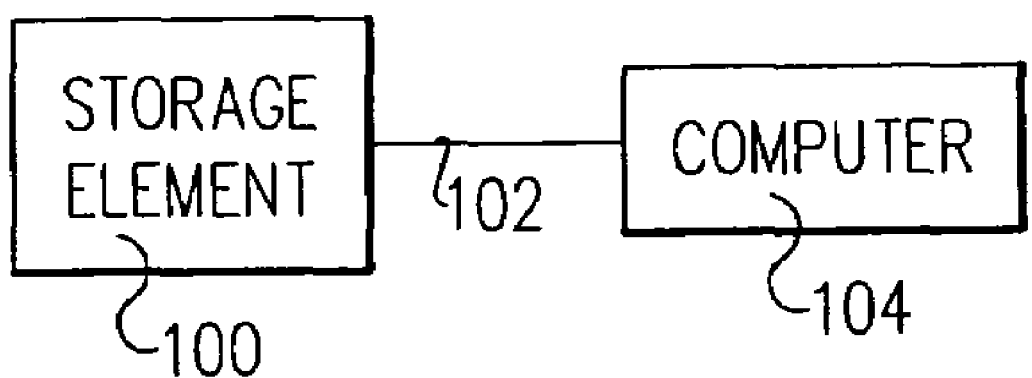
FIG. 6 is a high level system diagram illustrating a program storage device readable by a machine, tangibly embodying a program of instructions executable by a machine to perform method steps for synchronizing data languages, executable programs, and user interfaces.

Referring to FIG. 6, the invention can take the form of a computer program product accessible from a computer-usable or computer-readable medium 100 providing program code for use by or in connection with a computer 104 or any instruction execution system. For the purposes of this description, a computer-usable or computer-readable medium can be any apparatus that can contain, store, communicate, propagate, or transport the program, as is represented by line 102, for use by or in connection with the instruction execution, system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A computer-implemented method of synchronizing elements in a database between two languages, the computer-implemented method comprising:
   configuring a specific processor to perform the steps of:
   entering, into a database, a first string of data elements, wherein the first string of data elements are written in a first language;
   assigning a unique tag to each data element in the first string, wherein each unique tag corresponds to a variable name for a specific data element, and wherein each unigue tag is written in a jargon that is unintelligible to a speaker of the first language and the second language;
   storing the first string of data elements with corresponding unique tags in a control file;
   associating each unique tag with a corresponding data element in a second string of data elements, wherein the second string of data elements is written in a second language, wherein each unigue tag is assigned a different enumerated value, and wherein a set of enumerated values define a same sequential order of corresponding data elements in the first string of data elements and the second string of data elements;
   receiving an input data element that is written in the second language;
   converting the input data element from the second language to the first language by aligning the input data element with a corresponding data element in the first string, wherein the input data element and the corresponding data element share a same unique tag; and
   transmitting a converted input data element back to the database, wherein the converted input data element is newly written in the first language.

2. The computer-implemented method of claim 1, wherein the string of data elements are used by an Ethernet Migration Manager (EMM), wherein the EMM uses the first string of data elements and the second string of data elements to control a migration of a workstation from a Token Ring configuration to an Ethernet configuration.

3. The computer-implemented method of claim 1, wherein the database is associated with a control file that includes a National Language Support (NLS) section, wherein the NLS section synchronizes data elements from the first string of data elements with data elements from the second string of data elements.

4. The computer-implemented method of claim 3, wherein the control file is an .INI file that is used to configure the specific processor in a client computer.

5. A system for synchronizing elements in a database between two languages, the system comprising:
 data input logic for entering, into a database, a first string of data elements, wherein the first string of data elements are written in a first language;
 assignment logic for assigning a unique tag to each data element in the first string, wherein each unique tag corresponds to a variable name for a specific data element, and wherein each unigue tag is written in a jargon that is unintelligible to a speaker of the first language and the second language;
 storage logic for storing the first string of data elements with corresponding unique tags in a control file;
 association logic for associating each unique tag with a corresponding data element in a second string of data elements, wherein the second string of data elements is written in a second language, and wherein each unigue tag is assigned a different enumerated value, and wherein a set of enumerated values define a same sequential order of corresponding data elements in the first string of data elements and the second string of data elements;
 receiving logic for receiving an input data element that is written in the second language;
 conversion logic for converting the input data element from the second language to the first language by aligning the input data element with a corresponding data element in the first string, wherein the input data element and the corresponding data element share a same unique tag; and transmission logic for transmitting a converted input data element back to the database, wherein the converted input data element is newly written in the first language.

6. The system of claim 5, wherein the string of data elements are used by an Ethernet Migration Manager (EMM), wherein the EMM uses the first string of data elements. and the second string of data elements to control a migration of a workstation from a Token Ring configuration to an Ethernet configuration.

7. The system of claim 5, wherein the database is associated with a control file that includes a National Language Support (NLS) section, wherein the NLS section synchronizes data elements from the first string of data elements with data elements from the second string of data elements.

8. The system of claim 7, wherein the control file is an .INI file that is used to configure the specific processor in a client computer.

9. A tangible non-transitory computer readable storage medium on which is stored computer executable instructions that, when executed, perform the computer-implemented method of:
 entering, into a database, a first string of data elements, wherein the first string of data elements are written in a first language;
 assigning a unique tag to each data element in the first string, wherein each unique tag corresponds to a variable name for a specific data element, and wherein each unique tag is written in a jargon that is unintelligible to a speaker of the first language and the second language;
 storing the first string of data elements with corresponding unique tags in a control file;
 associating each unique tag with a corresponding data element in a second string of data elements, wherein the second string of data elements is written in a second language, and wherein each unigue tag is assigned a different enumerated value, and wherein a set of enumerated values define a same sequential order of corresponding data elements in the first string of data elements and the second string of data elements;
 receiving an input data element that is written in the second language;
 converting the input data element from the second language to the first language by aligning the input data element with a corresponding data element in the first string, wherein the input data element and the corresponding data element share a same unique tag; and
 transmitting a converted input data element back to the database in the first language.

10. The tangible computer storage medium of claim 9, wherein the string of data elements are used by an Ethernet Migration Manager (EMM), wherein the EMM uses the first string of data elements and the second string of data elements to control a migration of a workstation from a Token Ring configuration to an Ethernet configuration.

11. The tangible computer storage medium of claim 9, wherein the database is associated with a control file that includes a National Language Support (NLS) section, wherein the NLS section synchronizes data elements from the first string of data elements with data elements from the second string of data elements.

12. The tangible computer storage medium of claim 11, wherein the control file is an .INI file that is used to configure the specific processor in a client computer.

* * * * *